UNITED STATES PATENT OFFICE.

ALVAH W. ESTABROOK, OF KANSAS CITY, MISSOURI, AND HARRY E. WEAVER, OF KANSAS CITY, KANSAS, ASSIGNORS TO THE LARABEE FLOUR MILLS COMPANY, OF HUTCHINSON, KANSAS, A CORPORATION OF KANSAS.

DRY-SHORTENING FLOUR.

1,105,638. Specification of Letters Patent. Patented Aug. 4, 1914.

No Drawing. Application filed August 4, 1913. Serial No. 782,892.

*To all whom it may concern:*

Be it known that we, ALVAH W. ESTABROOK and HARRY E. WEAVER, citizens of the United States, residing, respectively, in Kansas City, in the county of Jackson and State of Missouri, and Kansas City, in the county of Wyandotte and State of Kansas, have invented new and useful Improvements in Dry-Shortening Flour, of which the following is a specification.

Our invention relates to a dry-shortening flour, in which a finely comminuted edible, fatty acid is mixed with flour in the dry state so that when the flour is made into a dough by the addition of water, milk, or the like, and baked, the said fatty acid will be softened or melted, and will be in a condition to exert a shortening action on the product.

The fatty acid which we prefer to employ is stearic acid. This acid is relatively hard and can be powdered with comparative ease and mixed with flour, and under ordinary conditions may be kept for an indefinite length of time without becoming soft and greasy. It is, besides, practically white in color, and the biscuit made from it will be whiter in color than biscuit shortened by the use of lard, butter, or other fat.

The stearic acid, when mixed with flour in a dry state, will remain chemically and physically separate therefrom; that is to say, it will not modify, or itself be modified by, the flour.

As to proportions, we have found, for making ordinary biscuits, that from ten to twelve pounds of stearic acid should be mixed with two hundred pounds of flour. The amount of stearic acid, however, may be varied within reasonable limits, as will be understood, according to the degree of shortening which it is desired to obtain.

Stearic acid can be readily obtained in a practically pure state, and when ground or powdered and mixed with flour the product can be barreled or sacked for commercial use and kept for an indefinite length of time without material deterioration.

In practice, in addition to the stearic acid, we would also add to the flour any suitable baking powder, or salts capable of reacting when moistened and subjected to heat to liberate carbonic acid gas, and, if desired, suitable seasoning.

To use the flour to make biscuits, or a similar shortened product, it is only necessary to make a dough of the flour by adding milk or water, and then subjecting the dough to baking.

By our invention we are enabled to produce a dry, or self-shortening flour in an economical manner, one that is free from any undesirable attributes, either as to keeping quality or flavor, and which, when made into a dough and baked will produce a shortened product indistinguishable from one which has been made by adding to the flour lard, butter, or other fat, as is now customary.

We claim:

1. A dry-shortening flour containing a comminuted, edible fatty acid.

2. A dry-shortening flour containing comminuted stearic acid.

3. The herein described product, comprising flour having mixed therewith in the dry state a powdered, edible, fatty acid, and gas producing materials.

4. The herein described product, comprising flour having mixed therewith in the dry state powdered stearic acid, and gas producing materials.

In testimony whereof, we have hereunto set our hands in presence of two subscribing witnesses.

ALVAH W. ESTABROOK.
HARRY E. WEAVER.

Witnesses:
DAVID V. WHITNEY,
R. C. JACKMAN.